United States Patent [19]

Rosenthal

[11] Patent Number: 4,920,833
[45] Date of Patent: May 1, 1990

[54] BLIND SETTING RIVET

[76] Inventor: Eric Rosenthal, 112-50 78th Ave., Forest Hills, N.Y. 11375

[21] Appl. No.: 282,617

[22] Filed: Dec. 12, 1988

[51] Int. Cl.$^5$ ............................................. B25B 13/02
[52] U.S. Cl. .................................. 87/124.1; 411/29; 411/34; 411/40
[58] Field of Search ................ 87/121.1, 124.1, 125; 279/1 M, 102; 411/29, 34–38, 40, 41, 43, 55

[56] References Cited

U.S. PATENT DOCUMENTS

| | | | |
|---|---|---|---|
| 1,509,680 | 9/1924 | Meek | 87/124.1 |
| 2,466,372 | 4/1949 | Byrd | 289/102 X |
| 3,392,767 | 7/1968 | Stillwagon | 87/125 X |
| 3,403,593 | 10/1968 | Moore | 411/29 |
| 3,426,375 | 2/1969 | Jeal | 411/35 X |
| 3,489,041 | 1/1970 | Hauenstein et al. | 81/125 X |
| 3,696,702 | 10/1972 | Krause | 411/41 |
| 3,750,525 | 8/1973 | Waters et al. | 411/34 |
| 4,357,845 | 11/1982 | Cornia | 81/125 |
| 4,752,169 | 6/1988 | Pratt | 411/43 |

*Primary Examiner*—James G. Smith
*Attorney, Agent, or Firm*—Goodman & Teitelbaum

[57] ABSTRACT

A blind setting rivet slidingly joined to a rivet installation tool for rotation therewith for drilling the rivet through walls, panels or components of a member. The rivet includes a shank threadingly joined to a sleeve thereon, the shank having a drilling bit on a forward end thereof. The sleeve has an enlarged flange on a rear end thereof to prevent the sleeve from passing entirely out through the hole formed in the walls, panels or components, and also to prevent the sleeve from rotating upon engagement with the walls, panels or components when the shank is rotated by the tool, thus causing the drilling bit to deform the forward end of the sleeve to form an enlarged collar to capture the sleeve within the hole formed in the walls, panels or components by the drilling bit, where the sleeve joins the walls, panels or components together. The tool has a non-circular opening to receive a non-circular mandrel section of the shank so that the tool can rotate the shank. Preferably, the tool includes a magnet to releasably secure the mandrel section therein, and a spring to eject a broken-off rear shank portion format the tool once the sleeve is deformed. The tool is adapted to be received in a conventional electric drill for rotation thereof.

7 Claims, 3 Drawing Sheets

BLIND SETTING RIVET

BACKGROUND OF THE INVENTION

This invention relates to improvements in rivets or fastener devices and, more particularly, to blind setting rivets or fastener devices provided with a drill bit, for the self-drilling thereof through walls or panels which are to be secured together by the rivets or fastener devices.

Rivets or blind fastener devices are well known in the art for securing walls or panels together, the most commonly used being known as "pop-rivets". Other developed blind fasteners are well known as "molly-bolts". Both the "pop-rivet" and the "molly-bolt" require a pre-drilled hole through the walls or panels that are to be joined. Other types of rivets or blind fastener devices which require a pre-drilled hole are discussed in U.S. Pat. Nos. 2,385,886, 3,643,544 and 4,388,031. Each of these patents shows a shank having an enlarged head which is passed through the pre-drilled hole, and then pulled back in such a manner that the enlarged head deforms or spreads out a portion of a sleeve member disposed around the shank, so that the enlarged head is prevented from being pulled back out through the pre-drilled hole. It is noted, that the shank can be provided with external threads thereon to be threaded into the internal threads of the sleeve member so that rotation of the shank will cause the shank to be drawn out from the pre-drilled hole, and thus deform the sleeve member or an associated sleeve, as shown in the above-mentioned U.S. Pat. Nos. 3,643,544 and 4,388,031.

Self-drilling blind rivets or fastening devices are also well known in the art, whereby a drilling bit is provided on the forward end of the shank for drilling the required hole through the walls or panels. Such self-drilling blind rivets are disclosed in U.S. Pat. Nos. 3,750,518, 3,935,786 and 4,629,380, which show similar structure except that the drill tip in U.S. Pat. No. 4,629,380 is detachable during the rivet setting. U.S. Pat. No. 3,403,593 also discloses a self-drilling blind rivet in which the shank is threadedly engaged in the sleeve member. U.S. Pat. Nos. 3,412,594 and 4,085,337 each discloses an installation tool for rotational installation and upsetting of a self-drilling blind rivet.

It is noted, that each of the self-drilling blind rivets disclosed in the above-mentioned patents must have the rear end of the shank secured in and gripped by the jaws of a chuck or the like of an electric drill or the like in order to rotate same so that the drill bit at the opposite forward end of the shank can be drilled through the walls or panels. Accordingly, the chuck jaws must be opened to remove the shank after each rivet setting, and then closed upon the next rivet shank for the installation thereof, this procedure being performed over and over again until all the rivets are installed.

SUMMARY OF THE INVENTION

Accordingly, it is an object of the present invention to provide a blind setting rivet which improves upon the afore-described prior art rivets.

Another object of the present invention is to provide a blind setting rivet which includes a drilling bit on a forward end thereof for drilling its own hole through walls or panels to be joined by the rivet.

Yet another object of the present invention is to provide a blind setting rivet including a shank threadingly secured within a sleeve, with a drilling bit provided on the forward end of the shank.

Yet a further object of the present invention is to provide a blind setting rivet as described above wherein the sleeve has an enlarged flange on a rearward end thereof to limit the passing of the sleeve through the hold and to prevent rotation of the sleeve so that rotation of the shank deforms the forward end of the sleeve to prevent the sleeve from being pulled back out of the hole formed in the walls or panels.

Another object of the present invention is to provide a blind setting rivet as described above wherein the shank is provided with a break-off portion to remove the rear portion of the shank once the sleeve is deformed.

Still another object of the present invention is to provide a blind setting rivet as described above which can be conveniently, securely and quickly received in a rivet installation tool.

Yet another object of the present invention is to provide a blind setting rivet and rivet installation tool as described above wherein the rivet installation tool includes a magnet for releasably securing a mandrel rear section of the shank within the rivet installation tool.

Another object of the present invention is to provide a blind setting rivet and a rivet installation tool as described above wherein the rivet installation tool includes spring means for ejecting the broken-off rear shank portion.

And still yet another object of the present invention is to provide a blind setting rivet and a rivet installation tool as described above wherein the installation tool has a rear end which can be readily mounted into a conventional electric drill so that the electric drill rotates the rivet installation tool, which in turn, rotates the shank of the rivet.

Another object of the present invention is to provide a blind setting rivet and a rivet installation tool as described above which can be conveniently and quickly assembled, which is reliable in securing the walls or panels together, and which is simple and inexpensive to manufacture.

These above objects are achieved in accordance with the present invention which includes, briefly, a blind setting rivet and a rivet installation tool. The rivet is formed from two parts, a shank and a sleeve which are threadingly joined together. The shank has a drilling bit on a forward end thereof and a mandrel section at a rear end thereof to be received in the rivet installation tool. The sleeve has an enlarged flange on a rear end thereof to limit the passing of the sleeve through the hole formed in the walls or panels to prevent the sleeve from rotating when the shank is rotated by the rivet installation tool, thus causing the drilling bit to deform the forward end of the sleeve to capture the sleeve within the hole formed in the walls or panels by the drilling bit.

The rivet installation tool has an opening in the forward end thereof to receive the shank mandrel section, the opening in the mandrel section being non-circular so that the rivet installation tool can rotate the shank. The rivet installation tool includes a magnet to releasably secure the mandrel section therein, and spring means to eject the broken-off shank portion from the rivet installation tool once the sleeve is deformed, whereby the shank includes a break-off portion to separate the rear portion of the shank once the sleeve is deformed. A rear end of the rivet installation tool is adapted to be received in a conventional electric drill so that the electric drill can rotate the rivet installation tool which, in turn, rotates the shank for the rivet setting.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

In the various figures of the drawings, like characters designated like parts.

DETAILED DESCRIPTION OF THE PREFERRED EMBODIMENT

Figure 1:
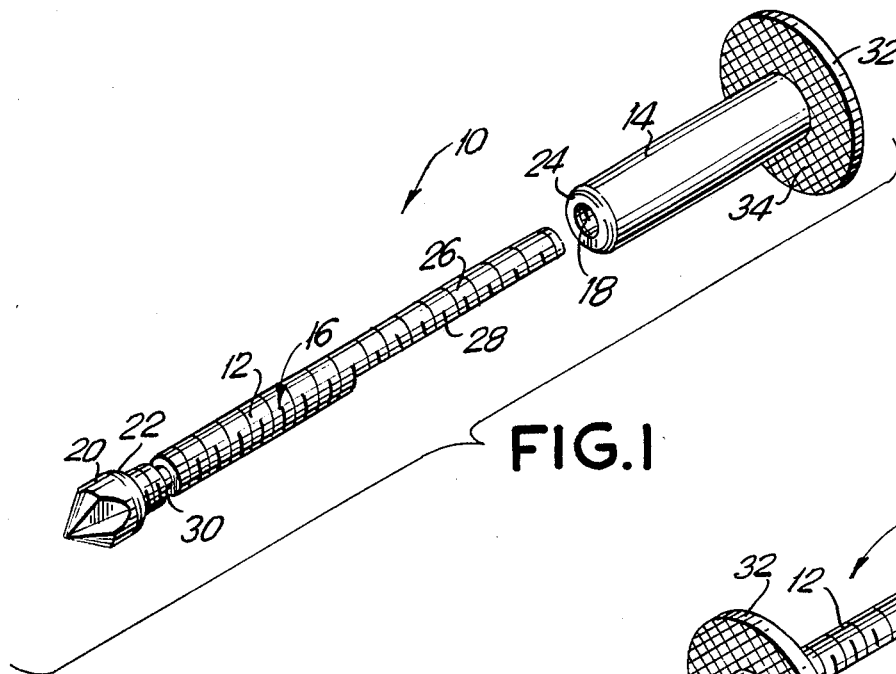
FIG. 1 is an exploded perspective view showing the two parts of the blind setting rivet in accordance with the present invention.
Figure 2:
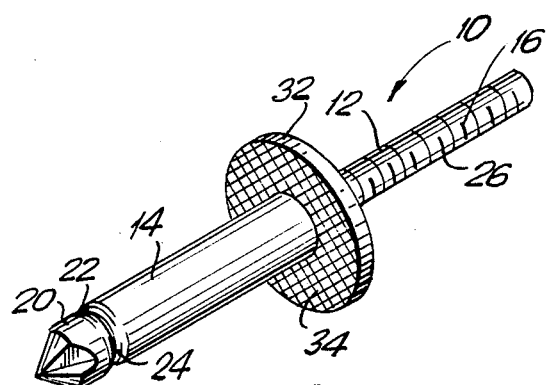
FIG. 2 is a perspective view showing the assembled blind setting rivet.
Figure 3:
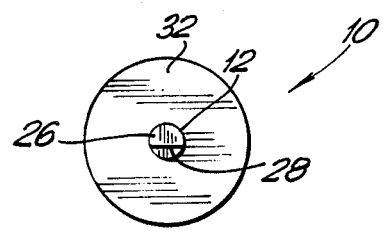
FIG. 3 is a rear elevational view of the blind setting rivet.
Figure 4:
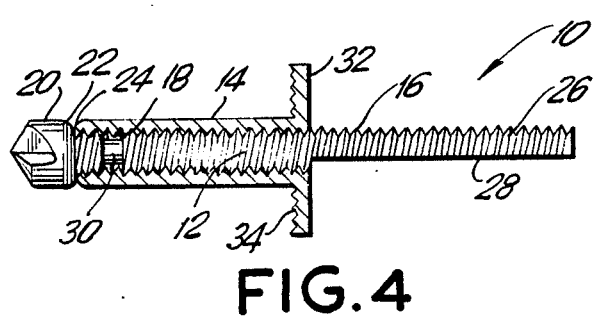
FIG. 4 is an elevational view, partly in cross-section, showing the blind setting rivet.

The drawings will now be discussed in detail, wherein FIGS. 1-4 show the blind setting rivet 10 in accordance with the present invention. The blind setting rivet 10 includes two parts, a shank 12 and a sleeve 14. As best shown in FIG. 4, the shank 12 is provided with an external thread 16 along the longitudinal length thereof, and the sleeve 14 is provided with a mating internal thread 18 throughout the hollow longitudinal interior opening thereof. Preferably, the threads 16, 18 are left-hand threads, the function of which will be discussed below.

A drilling bit 20 is provided on a forward end of the shaft 12. The drilling bit 20 has a diameter approximately equal to the outer diameter of the sleeve 14 so that their outer circumferences are approximately equal. The rear end portion 22 of the drilling bit 20 is rounded, and the forward end portion 24 of the sleeve 14 is also rounded, whereby the rounded rear end portion 22 engages the rounded forward end portion 24 when the shank 12 and the sleeve 14 are threadingly joined together, as best shown in FIG. 4, the function of which will be more fully explained below.

The rear portion of the shank 12 is provided with a non-circular D-shape, as best shown in FIG. 3, to provide a mandrel section 26, the function of which will be discussed below. It is noted, that the external thread 16 extends along the mandrel section 26 in order to facilitate the thread machining operation in the forming of the shank 12, where the flat surface 28 of the mandrel section 26 is formed after the forming of the thread 16. Accordingly, if desired, the mandrel section 26 could be formed without any threads thereon.

Additionally, a portion of the circumference of the shank 12 is reduced adjacent to, but spaced from, the drilling bit 20 to provide a break-off shank portion 30. Preferably, there are two or three threads between the drilling bit 20 and the break-off shank portion 30, where the function of the break-off shank portion 30 will be discussed below.

The sleeve 14 has an enlarged flange 32 on the rear end thereof to provide a stop to prevent the sleeve 14 and the shank joined thereto from passing entirely through the holes formed by the drilling bit 20 in the walls or panels, as described below. Furthermore, the forward surface 34 has a textured rough construction, the function of which is also described below.

To assemble the blind setting rivet 10, the free end of the mandrel section 26 is inserted into the mouth of the forward hollow end of the sleeve 14, and then the shank 12 is threaded into the sleeve 14 until the rounded rear end portion 22 of the drilling bit 20 abuts against the forward rounded end portion 24 of the sleeve, as best shown in FIGS. 2 and 4. It is noted, that the break-off shank portion 30 is now positioned within the sleeve 14, as shown in FIG. 4.

Figure 5:
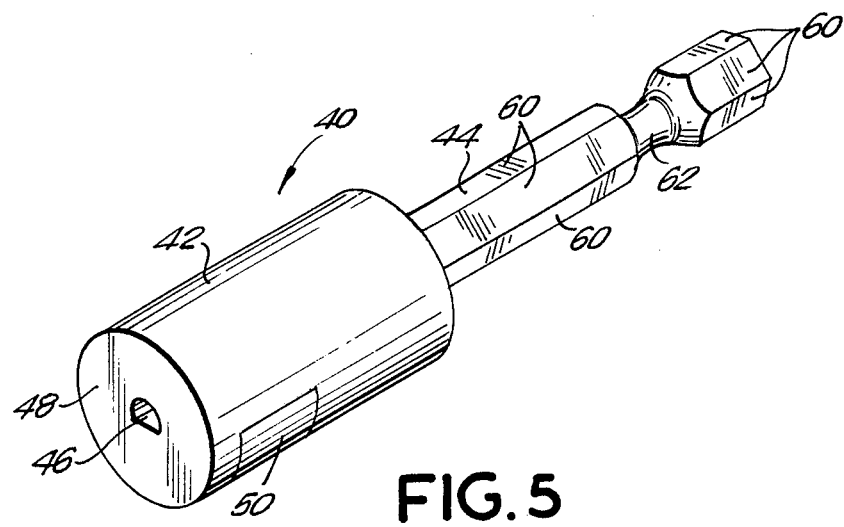
FIG. 5 is a perspective view of the rivet installation tool for installing the blind setting rivet of FIGS. 1-4 in accordance with the present invention.
Figure 6:
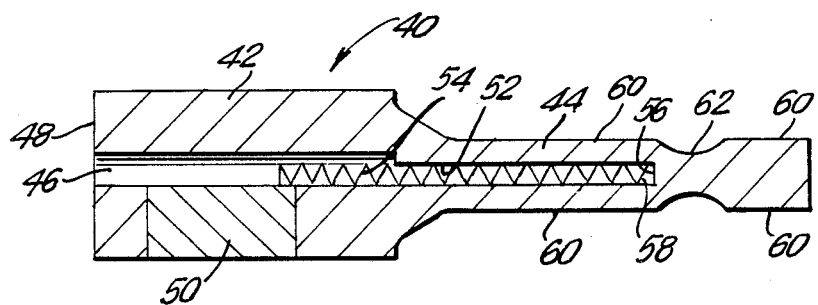
FIG. 6 is a cross-sectional elevational view of the rivet installation tool
Figure 8:
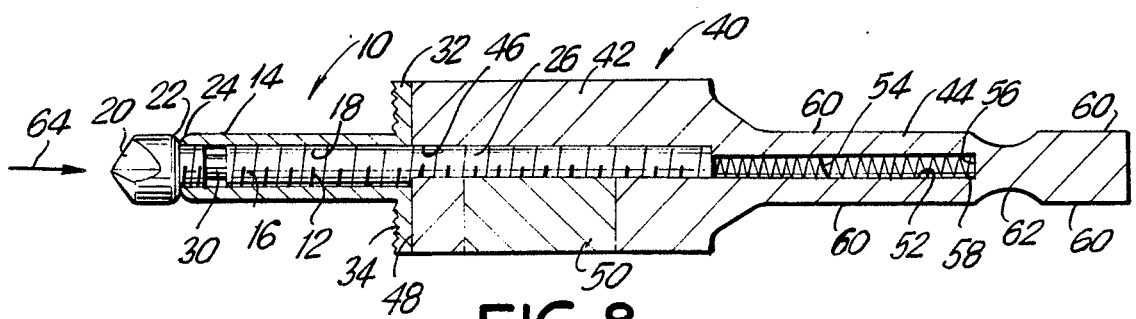
FIG. 8 is a cross-sectional elevational view similar to FIG. 7, showing the mandrel section of the blind setting rivet fully seated in the rivet installation tool.

FIGS. 5 and 6 show the rivet installation tool 40 in accordance with the present invention. The rivet installation tool 40 includes a forward cylindrical portion 42 and a rear stem portion 44. The cylindrical portion 42 preferably has a diameter approximately equal to the diameter of the sleeve flange 32, as best shown in FIG. 8. An opening 46 is provided in the forward surface 48 of the cylindrical portion 42 and extends entirely longitudinally through the cylindrical portion 42 along the central axis thereof. The opening 46 is non-circular, being D-shaped and sized to matingly receive the mandrel section 26 of the shank 12 therein, where the length of the opening 46 is approximately equal to the length of the mandrel section 26. A magnet 50 is inserted into the cylindrical portion 42 so that the magnet 50 extends from the outer perimeter of the cylindrical portion 42 to the opening 46, as best shown in FIG. 6.

Additionally, a further opening 52 having a smaller diameter is provided in the stem portion 44 in communication with the larger diameter opening 46. The opening 52 is also longitudinally disposed along the central axis of the stem 44. However, the opening 52 does not extend entirely through the stem portion 44, but rather ends at a substantial distance from the rear end of the stem portion 44. It is noted, that the mandrel section 26 also has a larger diameter than the opening 52, and therefore cannot enter the opening 52.

A spring 54, preferably a coil spring, is provided in the opening 52 and extends from the blind rear end 56 of the opening 52 into the forward opening 46, where the spring 54 occupies approximately one-third of the rear portion of the opening 46, as best shown in FIG. 6. The rear end 58 of the spring 54 is secured at the rear end 56 of the opening 52 by conventional means, such as by a frictional force-fit therebetween and the like, so that the spring 54 will not fall out of the openings 46, 52.

The stem portion 44 is smaller in diameter than the cylindrical portion 42, and is provided with a non-circular outer surface, such as flat surfaces 60, so that the stem portion can be received and gripped by the jaws of a chuck of a conventional electric drill and the like to prevent relative rotation therebetween. A reduced section 62 is provided near the rear end of the stem portion 44 so that a tongue member of the electric drill and the like can be engaged at the reduced portion 62 to prevent the stem portion 44 from being pulled out of the electric drill and the like once the chuck jaws are closed thereon. Though the stem portion 44 is intended to be rotated by a conventional electric drill, it is obvious that the stem portion 44 could be secured in other rotating devices, where these other rotating devices could be either power operated devices or manually operated devices.

Figure 7:
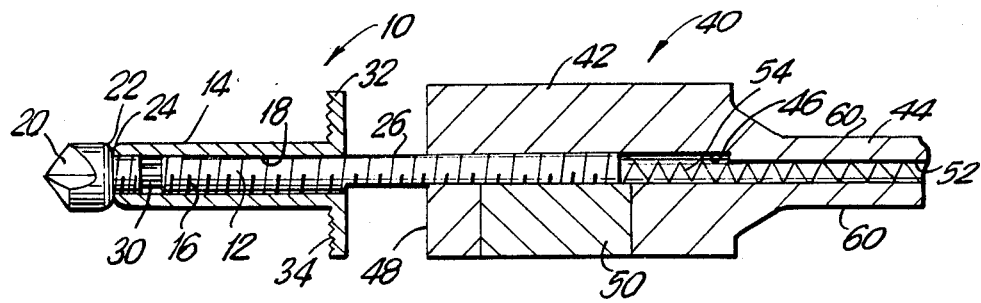
FIG. 7 is a cross-sectional elevational view showing the blind setting rivet being initially received in the rivet installation tool.

FIGS. 7 and 8 show the blind setting rivet 10 being secured in the rivet installation tool 40 so that the blind setting rivet 10 and the rivet installation tool 40 are joined together as a single unit. As shown in FIG. 7, the mandrel section 26 is slidingly inserted into the opening 46 of the cylindrical portion 42 of the rivet installation tool 40 until it engages the spring 54. Both parts of the blind setting rivet 10 are fabricated from metal, where the shank 12 is particularly fabricated from a magnet attracting metal, such as iron, steel and the like. Therefore, in the position shown in FIG. 7, the magnet 50 will attract the mandrel section 26 of the shank 12 to hold and releasably secure the mandrel section 26 in the opening 46 of the cylindrical portion 42 of the rivet installation tool 40. Preferably, the rivet installation tool 40 is also fabricated from metal.

Accordingly, when a force is applied in the direction of the arrow 64 against the tip of the drilling bit 20, as will be shown below, the mandrel section 26 is slidingly pushed rearwardly further into the opening 46 of the cylindrical portion 42 against the action of the spring 54 until the flange 32 of the sleeve 14 abuts against the forward surface 48 of the cylindrical portion 42, as best shown in FIG. 8. Obviously, the applied force must be greater than the attractive force of the magnet 50, taken in combination with the force created by the compression of the spring 54 in order to move the blind installation rivet 10 rearwardly, as will be shown below. It is noted, that the compression force created in the spring 54, when the mandrel section 26 is fully inserted in the opening 46, is greater than the attractive force of the magnet 50. Thus, if the force applied to the tip of the drilling bit 20 is removed, the spring 54 will overcome the magnetic attraction of the magnet 50 and eject the mandrel section 26 entirely from the opening 46 of the cylindrical portion 42, as will be further discussed below.

Figure 9:
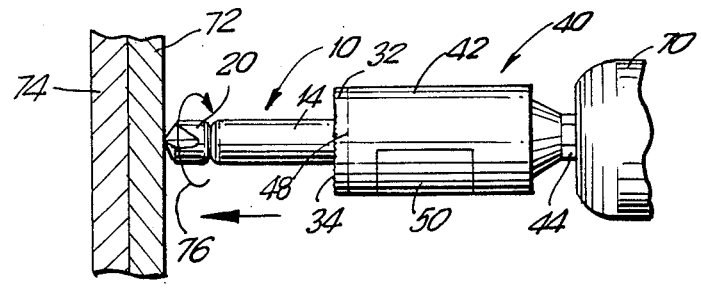
FIG. 9 is a fragmented elevational view, partly in cross-section, showing the blind setting rivet received in the rivet installation tool which, in turn, is received in an electric drill for rotation thereof prior to drilling the required holes in the walls or panels.

Referring to FIGS. 9–12, the procedure for installing the blind setting rivet 10 of the present invention will now be explained. First, the mandrel section 26 of the blind setting rivet 10 is slidingly inserted int the opening 46 of the cylindrical portion 42 of the rivet installation tool 40 to provide a single unit, as shown in FIG. 7. The stem portion 44 of the rivet installation tool 40 is then inserted and gripped by the chuck jaws of a conventional electric drill 70, as indicated in FIG. 9. This assembly is then brought forward so that the point of the drilling bit 20 abuts against the outer surface of the wall or panel 72 which is to be joined to the adjacent wall or panel 74, as shown in FIG. 9. Accordingly, this above action causes the mandrel section 26 to slidingly move further into the opening 46 so that the flange 32 of the sleeve 14 abuts against the forward surface 48 of the cylindrical portion 42, in the manner discussed above with reference to FIG. 8. The electric drill 70 is activated, causing the drilling bit 20 to rotate in the conventional clockwise direction as shown by the arrow 76 in FIG. 9. Thus, the drilling bit 20 starts to drill a hole in the wall or panel 72.

Figure 10:
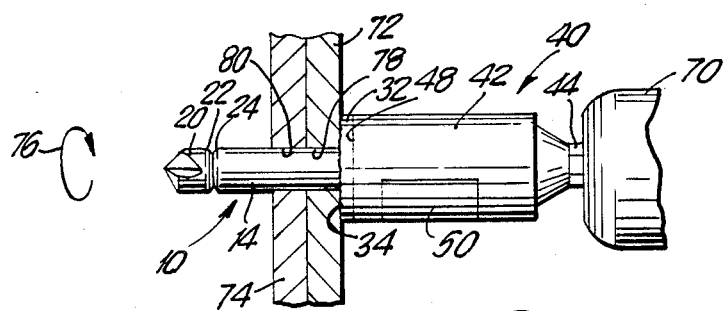
FIG. 10 is a fragmented elevational view, partly in cross-section, similar to FIG. 9, showing the blind setting rivet and rivet installation tool after the holes are formed in the walls or panels.

The drilling bit 20 continues to rotate in the direction of the arrow 76, thus forming the holes 78, 80 in the walls or panels 72, 74, respectively. Once the holes 78, 80 are formed, the sleeve 14 passes through the holes 78, 80 until the flange 32 of the sleeve 14 abuts against the outer surface of the wall or panel 72, as shown in FIG. 10, thus preventing the sleeve 14 from passing any further through the holes 78, 80. Upon engagement of the textured rough forward surface 34 of the flange 32 with the outer surface of the wall 72, the textured rough forward surface 34 prevents the flange 32 and the sleeve 14 thereof from rotating any further with respect to the wall or panel 72. However, the shank 12 of the blind setting rivet 10 and the drilling bit 20 thereon continue to rotate in the clockwise direction of the arrow 76.

Figure 11:
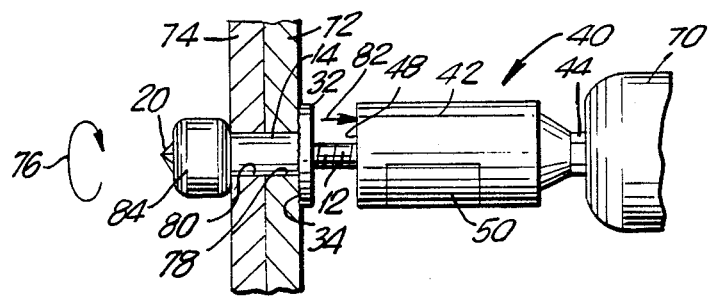
FIG. 11 is a fragmented elevational view, partly in cross-section, similar to FIG. 10, showing the setting of the blind setting rivet.

Because the shank 12 and sleeve 14 are joined together by the left-hand threads 16, 18 respectively, the abovementioned continued rotation of the shank 12 in the clockwise direction of the arrow 76 causes the shank 12 to be threaded rearwardly through the stationary sleeve 14 in the direction of the arrow 82 in FIG. 11, where the mandrel section 26 moves the rivet installation tool 40 rearwardly, as shown in FIG. 11. Thus, the forward surface 48 of the cylindrical portion 42 does not rotate against the sleeve flange 32 once the sleeve flange 32 stops rotating. Additionally, the rounded rear end portion 22 of the drilling bit 20 is forced against the rounded forward end portion 24 of the sleeve 14 so that the drilling bit 20 is forced into the hollow interior of the forward end portion 24 of the sleeve 14, thus deforming and enlarging the forward end portion 24 of the sleeve 14 to form an enlarged collar 84 thereon around the drilling bit 20, as shown in FIG. 11.

Figure 12:
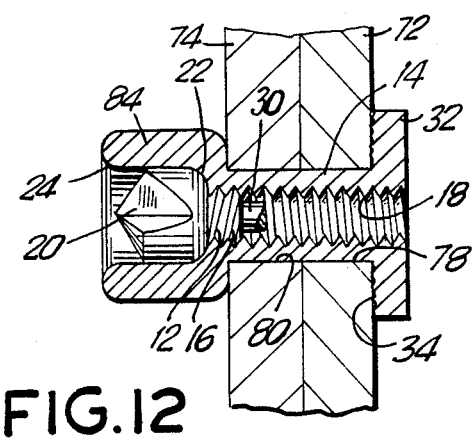
FIG. 12 is an enlarged fragmented cross-sectional elevational view showing the blind setting rivet after the setting thereof.

The drilling bit 20 continues to be drawn into the forward end of the sleeve 14, thus continuing to form the enlarged collar 84 until the frictional forces between the drilling bit 20 and the collar 84 reaches a point whereby the drilling bit 20 and the shank 12 thereof can no longer be rotated by the electric drill 70. At this point, the rotational forces of the electric drill 70 causes the shank 12 to twist off or shear at the break-off shank portion 30, as shown in FIG. 12. The electric drill 70 and the rivet installation tool 40 attached thereto are now withdrawn rearwardly so that the broken off rear portion of the shank 12 is threadingly withdrawn rearwardly from the sleeve 14.

Once the broken off rear portion of the shank 12 is free from the sleeve 14, the compressed spring 54 in the rivet installation tool 40 forwardly ejects the mandrel section 26 and the broken off rear portion of the shank 12 connected thereto from the opening 46 of the rivet installation tool 40. Accordingly, the rivet installation tool 40 is now free to quickly and easily receive the mandrel section 26 of another blind setting rivet 10 to install same in the walls or panels 72, 74 in the same manner as set forth above. Thus, a number of blind setting rivets 10 can quickly and easily be installed in the walls or panels 72, 74 by the above procedure using blind setting rivets 10 and a single rivet installation tool 40 of the present invention.

As shown in FIG. 12, the collar 84 abuts against the outer surface of the wall or panel 74 and the flange 32 abuts against the outer surface of the wall or panel 72 to secure the sleeve 14 within the holes 78, 80 in a non-removable arrangement so that the walls or panels 72, 74 are securely joined together. Due to the above mentioned frictional forces between the drilling bit 20 and the hollow interior of the collar 84, the drilling bit 20 is bonded or fused to the interior of the collar 84 and cannot be withdrawn therefrom. Thus, the enclosed drilling bit 20 and the threaded portion of the shank attached thereto function to strengthen the collar 84 so that the walls or panels 72, 74 cannot be pulled apart. Preferably, the axial length of the drilling bit 20 is predetermined so that the tip of the drilling bit 20 is positioned within the collar 84, as shown in FIG. 12, so that the drilling bit 20 cannot cause any damage to a passerby or any material which brushes up against the collar 84.

Numerous alterations of the structure herein disclosed will suggest themselves to those skilled in the art. However, it is to be understood, that the present disclosure relates to a preferred embodiment of the invention which is for the purpose of illustration only, and is not to be construed as a limitation of the invention.

What is claimed is:

1. A blind setting rivet in combination with a rivet installation tool, said rivet comprising:

a shank having a drilling bit on a forward end thereof and a mandrel section on a rear end thereof;

said shank being externally threaded;

a sleeve having a forward end portion, a rear end and an internally threaded opening disposed longitudinally through said sleeve to matingly receive said shank;

said shank being threadingly engaged in said sleeve with a rear end of said drilling bit abutting against said forward end portion of said sleeve, and said mandrel section extending outwardly from said rear end of said sleeve;

said sleeve having an enlarged flange on said rear end thereof to provide a stop to prevent said sleeve from passing entirely out through holes formed in the walls, panels and the like by said drilling bit, so that said forward end portion of said sleeve extends entirely outwardly from an inner surface of the walls, panels and the like;

said mandrel section having a non-circular configuration in order to rotate said shank;

said flange being provided with engagement means to prevent rotation of said sleeve while said shank is rotating when said flange engages an outer surface of the walls, panels and the like, so that continued rotation of said shank causes said shank to be threaded rearwardly through said sleeve in order for said drilling bit to deform said forward end portion of said sleeve to provide an enlarged collar thereon, with said sleeve flange being disposed on one side of the walls, panels and the like, and said collar being disposed on an opposite side thereof to join the walls, panels and the like together;

said drilling bit having a predetermined axial length;

said forward end portion of said sleeve having an axial length greater than said predetermined axial length of said drilling bit;

said rear end of said drilling bit being rounded, and said forward end portion of said sleeve being also rounded, so that said drilling bit is formed into and enlarges said forward end portion of said sleeve when said collar is being formed; and said drilling bit being disposed entirely within said collar after rotational setting of said rivet so that a forward tip of said drilling bit is positioned within said collar to avoid any damage when brushing up against said collar; and said tool comprising:

a forward cylindrical portion and a rear stem portion;

said forward cylindrical portion being provided with an opening in a forward surface thereof;

said opening of said cylindrical portion extending longitudinally through said cylindrical portion along its central axis;

walls of said opening of said cylindrical portion being non-circular and sized to matingly and slidingly receive said mandrel section of said rivet therein so that said tool rotates said shank when said tool is rotated;

said rear stem portion having a non-circular outer surface to be gripped and rotated by a rotating device;

said shank of said rivet being fabricated from a magnet attracting metal, and said cylindrical portion of said tool being provided with magnetic means in communication with a forward portion of said opening to releasably secure said mandrel section of said rivet in said opening when said mandrel portion is in a first position;

spring means being provided in a rear portion of said opening to act upon said mandrel section of said rivet when said mandrel section is in a second position spaced rearwardly from said first position in order to eject said mandrel section from said opening after said rivet is set; and said spring means having a greater force than said magnetic means to overcome any magnetic attraction of said magnetic means when ejecting said mandrel section of said rivet.

2. A blind setting rivet and rivet installation tool according to claim 1, wherein said mandrel section and said walls of said opening of said cylindrical portion are both D-shaped.

3. A blind setting rivet and rivet installation tool according to claim 1, wherein said mandrel section and said walls of said opening of said cylindrical portion are both D-shaped, said shank being provided with a break-off portion adjacent to said drilling bit on a forward portion of said shank so that a rear portion of said shank breaks off after said collar is formed, and said spring means ejecting said rear portion of said shank after said rear portion breaks off.

4. A rivet installation tool for setting a rivet, said tool comprising:

a forward cylindrical portion and a rear stem portion;

said forward cylindrical portion being provided with an opening in a forward surface thereof;

said opening extending longitudinally through said cylindrical portion along its central axis;

walls of said opening being non-circular and sized to matingly and slidingly receive a rear section of the rivet therein so that said tool rotates the rivet when said tool is rotated;

said rear stem portion having a non-circular outer surface to be gripped and rotated by a rotating device;

said cylindrical portion being provided with magnetic means in communication with a forward portion of said opening to releasably secure the rear section of the rivet in said opening when the rear section is in a first position;

spring means being provided in a rear portion of said opening to act upon the rear section of the rivet when the rear section is in a second position spaced rearwardly from said first position in order to eject the rear section from said opening after the rivet is set;

said spring means having a greater force than said magnetic means to overcome any magnetic attraction of said magnetic means when ejecting the rear section of the rivet;

said forward portion of said opening having a larger transverse dimension than said rear portion of said opening to provide stop means to prevent the rear section of the rivet from entering said rear portion of said opening; and said spring means being a coil spring secured in said rear portion of said opening and extending forwardly into said forward portion of said opening in order to engage with the rear section of the rivet.

5. A rivet installation tool according to claim 4, wherein walls of said opening are D-shaped.

6. A blind setting rivet and rivet installation tool according to claim 1, wherein said engagement means includes a textured rough construction on a forward surface of said flange, and said shank and said sleeve being threaded with left-hand threads.

7. A rivet installation tool according to claim 4, wherein said magnetic means is a magnetic transversely extending inwardly from an outer perimeter on one side of said cylindrical portion to said forward portion of said opening.

* * * * *